United States Patent [19]
Katsuki

[11] Patent Number: 4,725,470
[45] Date of Patent: Feb. 16, 1988

[54] MAGNETIC DISK MEDIUM
[75] Inventor: Toshiyuki Katsuki, Nagaoka, Japan
[73] Assignee: Alps Electric Co., Ltd., Japan
[21] Appl. No.: 911,235
[22] Filed: Sep. 24, 1986
[30] Foreign Application Priority Data
  Sep. 27, 1985 [JP]  Japan ................... 60-215927
[51] Int. Cl.$^4$ .................... G11B 5/704; G11B 5/64
[52] U.S. Cl. ............................ 428/64; 360/135;
  428/65; 428/163; 428/308.4; 428/694; 428/900
[58] Field of Search ................. 428/64–66,
  428/694, 900, 308.4, 163, 167; 360/135

[56] References Cited
U.S. PATENT DOCUMENTS 3,130,110  4/1964  Schmidt .............................. 428/65
4,107,752  4/1978  Johnson, Jr. ...................... 360/135

FOREIGN PATENT DOCUMENTS 2948845  7/1980  Fed. Rep. of Germany ...... 360/135

Primary Examiner—Paul J. Thibodeau
Attorney, Agent, or Firm—Guy W. Shoup

[57] ABSTRACT

A magnetic disk medium having a magnetic layer formed on its substrate, is characterized in that in a portion of the substrate where a magnetic head runs is formed a concave groove in which a cushion material is provided, whereby the contact pressure appearing between it and the magnetic head is lowered.

Preferably, the cushion material is either plastic foam selected from the group consisting of polyurethane foam, polystyrene foam, cellular polyethylene, cellular rubber, cellular polyvinyl chloride, and foamed polyester, or elastic silicone resin.

2 Claims, 1 Drawing Figure

U.S. Patent  Feb. 16, 1988  4,725,470
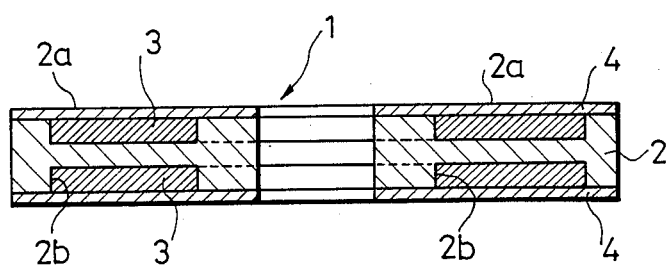

MAGNETIC DISK MEDIUM

BACKGROUND OF THE INVENTION

1. Field of the Invention

This invention relates to a magnetic disk medium, such as a fixed magnetic disk medium, having a cushion material provided in a portion thereof where a magnetic head runs.

2. Description of the Prior Art

One of the conventional magnetic disk mediums used as the fixed magnetic disk medium for high-density recording has a protective coating provided on its surface, such as a graphitoid carbon thin film, a diamondoid carbon thin film, a thin film made of graphitoid carbon thin films and diamondoid carbon thin films piled one upon another alternately, or a thin film made from a mixture of graphitoid carbon and diamondoid carbon (see Japanese Patent Publication No. 60-23406). According to this publication, the protective coating is provided on the whole surface of the magnetic film of the magnetic disk medium, or only on an area of the surface of the magnetic film which area is liable to collide with and rub against a magnetic head, or such an area is coated thicker than is the other area.

The foregoing conventional magnetic disk was improved principally in the strength of the protective coating to provide the type capable of withstanding well collapse and wear caused by the magnetic head, but accompanied by the problem that since the contact pressure with the magnetic head rises contrarily the magnetic head is damaged owing to an impact caused by their contact.

SUMMARY OF THE INVENTION

It is the object of the present invention to weaken the contact pressure appearing between a magnetic head and a magnetic disk medium to prevent a crash of the head to thereby protect the magnetic head and the magnetic disk medium from being damaged, thus, to provide a novel magnetic disk medium for high-density recording which is light, mass-producible, and low-cost.

In brief, the present invention resides in a magnetic disk medium having a magnetic layer provided on its substrate, which is characterized in that in a portion of the substrate over which a magnetic head runs there is formed a concave groove in which a cushion material is provided.

According to the magnetic disk medium of the present invention, the cushion material lowers the contact pressure appearing between it and the magnetic head.

BRIEF DESCRIPTION OF THE DRAWING

The sole drawing is a sectional view showing an embodiment of the present invention.

DESCRIPTION OF THE PREFERRED EMBODIMENT

An embodiment of the present invention will now be described with reference to the drawing. The sole drawing is a sectional view of a planar circular magnetic disk medium 1, in which reference numeral 2 indicates a substrate. This substrate 2 is made from polyimide resin, polyethylene resin, or vinyl chloride resin, as well as aluminum, magnesium, glass, ceramics, etc. Specifically, if resin or magnesium mentioned above is used, the disk becomes light. Further, if resin or glass mentioned above is used, it can be produced at low cost advantageously.

In a portion 2a of either side surface of the substrate 2 over which the magnetic head runs there is formed a concave groove 2b extending along the circumference. In the concave groove 2b is provided a cushion material 3 so as to be flush with the pertinent side surface of the substrate 2. As the cushion material 3 is used plastic foam, such as polyurethane foam, polystyrene foam, cellular polyethylene, cellular rubber, cellular polyvinyl chloride, and foamed polyester, as well as elastic silicone resin.

By providing the cushion material 3 in the concave groove 2b as described above, it is possible to bond a magnetic layer 4 hereinafter described to the surface of the cushion material 3 without loosening, and this cushion material serves as a damper against an impact acting on the magnetic head to thereby solve the problem of the head being crushed.

To both surfaces of the substrate 2 and cushion material 3 is bonded the magnetic layer 4. This magnetic layer 4 can be formed by applying a mixture of iron oxide which is ferromagnetic substance and resin through the spin coating process, dipping process, or like process, and may be formed by coating metallic magnetic material through the plating process or spattering process. On the surface of the magnetic layer 4 is formed a protective film made from either organic material, such as Teflon and fatty acid resin, or inorganic material such as molybdenum disulfide.

As will be apparent from the foregoing description, according to the present invention, the concave groove is formed in a portion of the substrate over which the magnetic head runs and in this concave groove is provided the cushion material. Thus the contact pressure of the magnetic disk medium with the magnetic head is absorbed and weakened by means of the cushion material, the problem of the head being crashed is solved, and the magnetic head and the magnetic disk medium can be prevented from being damaged.

Further, by choosing light-weight material as the substrate and cushion materials, the present invention can realize reduction of weight of the magnetic disk medium, produce the magnetic layer at low costs because of mass-producibility, and prevent occurrence of loosening of the magnetic layer because of the use of the cushion material.

Furthermore, the magnetic disk medium according to the present invention can be used also as a magnetic disk medium adapted for Stretch Surface Recording; thus, its usefulness in this field is significantly enhanced.

What is claimed is:

1. A magnetic disk medium, for use in rotation relative to a magnetic head, having a magnetic layer formed on a surface of a substrate, characterized in that a groove concentric with the disk medium is formed in the surface of the substrate in the area over which the magnetic head runs, and a cushion material is provided in said groove so as to be flush with the disk substrate surface, and the magnetic layer is bonded onto the cushion material.

2. A magnetic disk medium according to claim 1, wherein said cushion material is selected from the group consisting of polyurethane foam, polystyrene foam, cellular polyethylene, cellular rubber, cellular polyvinyl chloride, foamed polyester, and elastic silicone resin.

* * * * *